United States Patent
Terada et al.

(12)

(10) Patent No.: US 8,081,927 B2
(45) Date of Patent: Dec. 20, 2011

(54) DIGITAL DATA PROCESSING CIRCUIT

(75) Inventors: Satoshi Terada, Paramus, NJ (US); Masahiro Obuchi, Oizumi (JP); Tadahiro Makabe, Oizumi (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 453 days.

(21) Appl. No.: 12/392,762

(22) Filed: Feb. 25, 2009

(65) Prior Publication Data

US 2010/0216416 A1    Aug. 26, 2010

(51) Int. Cl.
*H04B 7/00* (2006.01)

(52) U.S. Cl. .......................... 455/42; 455/112; 455/118

(58) Field of Classification Search .................. 455/42, 455/110, 112, 113, 118
See application file for complete search history.

(56) References Cited

U.S. PATENT DOCUMENTS

| | | | |
|---|---|---|---|
| 6,215,981 B1 * | 4/2001 | Borchardt et al. | 455/42 |
| 6,950,626 B2 * | 9/2005 | Suenaga | 455/41.2 |
| 6,954,615 B2 * | 10/2005 | Sano | 455/41.1 |
| 7,181,165 B2 * | 2/2007 | Yongji et al. | 455/42 |
| 7,860,458 B2 * | 12/2010 | Mabuchi | 455/41.2 |

\* cited by examiner

*Primary Examiner* — Hai L Nguyen
(74) *Attorney, Agent, or Firm* — SoCal IP Law LLP; Steven C. Sereboff; John E. Gunther

(57) ABSTRACT

A digital data processing circuit comprising: a setting unit configured to set setting data on an audio signal processing circuit configured to generate an FM modulated signal based on the setting data, the FM modulated signal being a signal to be transmitted wirelessly to an FM radio receiver; and an output unit configured to output audio data for reproducing a predetermined audio signal while the setting unit sets the setting data on the audio signal processing circuit.

3 Claims, 6 Drawing Sheets

DIGITAL DATA PROCESSING CIRCUIT

BACKGROUND OF THE INVENTION

1. Field of the Invention

The present invention relates to a digital data processing circuit.

2. Description of the Related Art

Recently, an FM (Frequency Modulation) transmitting circuit may be used to reproduce music data stored in a portable music reproducing device, etc., on a car stereo, for example (see, e.g., Japanese Patent Application Laid-Open Publication No. 2006-262521 or 2007-88657). FIG. 6 depicts a common configuration of a transmitting device 200 using an FM transmitting circuit 300 and a microcomputer 310 for transmitting an audio signal.

A frequency of a carrier in the FM transmitting circuit 300 is determined with consideration given to the frequency of an FM radio, etc., being used in its vicinity. Therefore, firstly, a user needs to set the frequency of the carrier in the FM transmitting circuit 300. Specifically, the user operates a key (not shown) of a controller 220 so that the frequency of the carrier displayed on a display screen (not shown) of the controller 220 will be a desired frequency. When the frequency of the carrier has been determined, the user then operates a key (not shown) of the controller 220 so that frequency data of the carrier will be output to the microcomputer 310. The microcomputer 310 transmits the frequency data output from the controller 220 to the FM transmitting circuit 300 as serial data SDA in synchronization with a clock signal SCL. As a result, the frequency of the carrier is set in the FM transmitting circuit 300, and the FM transmitting circuit 300 becomes capable of transmitting audio signals RIN and LIN to be input thereto to the car stereo by way of an antenna 230, for example.

When, in the above transmitting device 200, environment in the vicinity changes and a reproduced sound of the car stereo is affected by the FM radio, for example, it is necessary to change the frequency of the carrier of the FM transmitting circuit 300. In changing the frequency of the carrier, the audio signals RIN and LIN, which are outputs of an audio reproducing device 210, are temporarily stopped and the controller 220 is operated in general. For this reason, the setting of the FM transmitting circuit 300 is changed in a soundless state where no reproduced sound is output from the car stereo. Even in the case where the sound signals RIN and LIN are temporarily stopped while changing the setting, however, as a matter of fact, there is a case where an influence of a harmonic, etc., of the serial data SDA appears in an audible range so that a sound of transmitting the serial data SDA is reproduced as a noise by the car stereo. When the above noise is reproduced, the user may possibly suspect that the transmitting device 200 has a trouble, etc.

SUMMARY OF THE INVENTION

A digital data processing circuit according to an aspect of the present invention, comprises: a setting unit configured to set setting data on an audio signal processing circuit configured to generate an FM modulated signal based on the setting data, the FM modulated signal being a signal to be transmitted wirelessly to an FM radio receiver; and an output unit configured to output audio data for reproducing a predetermined audio signal while the setting unit sets the setting data on the audio signal processing circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
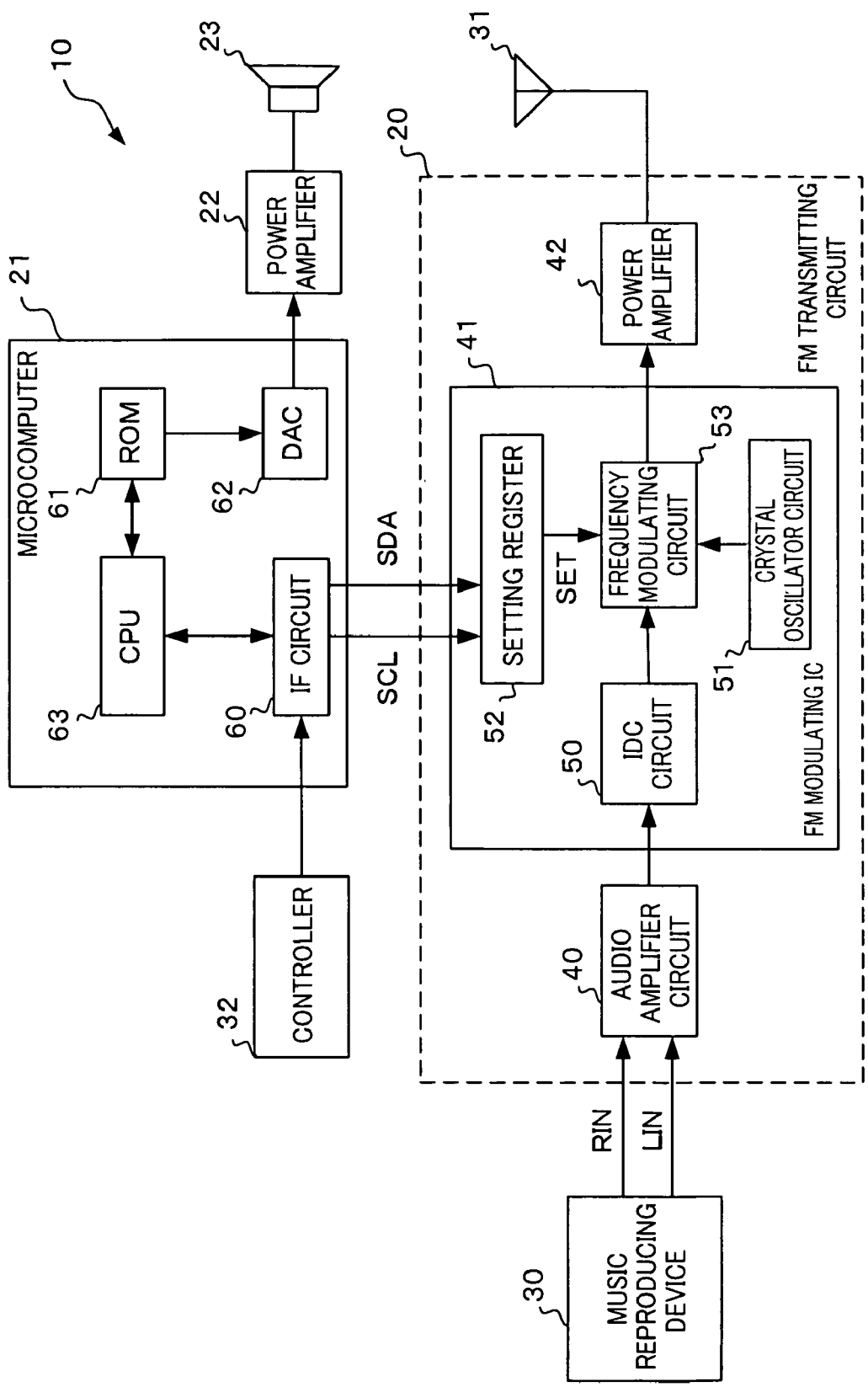
FIG. 1 is a diagram illustrating a transmitting device 10 according to a first embodiment of the present invention.

FIG. 1 depicts a transmitting device 10 according to a first embodiment of the present invention. The transmitting device 10 is a device for transmitting audio signals output from, for example, a music reproducing device 30 as an FM signal from an antenna 31 to be reproduced by a car stereo (not shown). The transmitting device 10 according to a first embodiment is a device that is capable of setting a frequency of the FM signal by an operation of a controller 32 by a user. The transmitting device 10 includes an FM transmitting circuit 20, a microcomputer 21, a power amplifier 22, and a speaker 23.

The FM transmitting circuit 20 is a circuit that generates a carrier of a frequency based on serial data SDA from the microcomputer 21 and a stereo composite signal based on audio signals RIN and LIN from the music reproducing device 30, and modulates the carrier with the stereo composite signal to be output as the FM signal to the antenna 31. The FM transmitting circuit 20 according to a first embodiment of the present invention includes an audio amplifier circuit 40, an FM modulating IC (Integrated Circuit) 41, and a power amplifier 42.

The audio amplifier circuit 40 is a circuit that amplifies the audio signals RIN and LIN, and generates the stereo composite signal corresponding to the audio signals RIN and LIN, and outputs the signals to the FM modulating IC 41.

The FM modulating IC 41 (audio signal processing circuit) is a circuit that generates the carrier of the frequency based on the serial data SDA from the microcomputer 21 to be modulated with the stereo composite signal. The modulated signal is output as the FM signal to the power amplifier 42 for wireless transmission to an FM radio receiver (not shown) of the car stereo (not shown). The FM modulating IC 41 according to a first embodiment of the present invention includes an IDC (Instantaneous Deviation Control) circuit 50, a crystal oscillator circuit 51, a setting register 52, and a frequency modulating circuit 53.

The IDC circuit 50 is a circuit that limits amplitude of the stereo composite signal amplified by the audio amplifier circuit 40 and outputs the signal of limited amplitude to the frequency modulating circuit 53.

The crystal oscillating circuit 51 is a circuit that generates a reference frequency, which serves as a reference of the FM modulating IC 51, together with a quarts crystal (not shown) connected thereto.

The setting register 52 is a circuit that holds the serial data SDA input from the microcomputer 21 in synchronization with a clock signal SCL, to be output to the frequency modulating circuit 53 as setting data (SET). In the setting register 52 according to an embodiment of the present invention, the setting data is updated after reception of the serial data SDA is completed.

The frequency modulating circuit 53 is a circuit that generates the carrier of the frequency based on the reference frequency and the setting data, and modulates the carrier with the stereo composite signal from the IDC circuit 50. The modulated carrier is output as an FM modulated signal to the power amplifier 42.

The power amplifier 42 is a circuit that amplifies the FM modulated signal so as to drive the antenna 31. An output of the power amplifier 42 is the FM signal.

The microcomputer 21 (digital data processing circuit) is a circuit that controls the FM transmitting circuit 20 and the power amplifier 22 according to an instruction from the controller 32, which is operated by the user in order to set the frequency of the FM signal. The microcomputer 21 includes an IF (Interface) circuit 60, a ROM (Read Only Memory) 61, a DAC (Digital to Analog Converter) 62, and a CPU (Central Processing Unit) 63.

The IF circuit 60 is a circuit for receiving and transmitting various data among the CPU 63, the FM transmitting circuit 20 and the controller 32. Specifically, the IF circuit 60 transmits the instruction from the controller 32 to the CPU 63, and transmits the data from the CPU 63 to the FM transmitting circuit 20.

The ROM 61 is a circuit that stores a program to be executed by the CPU 63 and audio data representing a beep sound which is a predetermined stereo audio signal. The ROM 61 according to an embodiment of the present invention outputs the audio data to the DAC 62 when an address in which the audio data is stored is output from the CPU 63.

The DAC 62 (converting unit) is a circuit that converts digital audio data output from the ROM 61 into an analog audio signal, to be output to the power amplifier 22. The DAC 62 according to a first embodiment of the present invention outputs the audio signal when converting the audio data into the audio signal. The converted audio signal has been converted from a stereo signal into a monaural signal.

Figure 2:
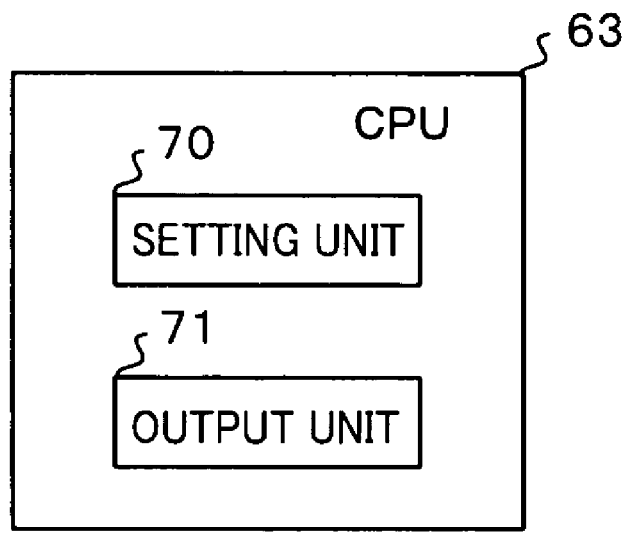
FIG. 2 is a diagram illustrating a configuration of functional blocks to be realized by execution of a program by a CPU 63.

The CPU 63 is a circuit that realizes various functions by executing the program stored in the ROM 61 according to the instruction from the controller 32. FIG. 2 depicts a configuration of functional blocks to be realized by execution of the program by the CPU 63. The CPU 63 according to a first embodiment of the present invention realizes a setting unit 70 and an output unit 71 by executing the program.

The setting unit 70 outputs frequency data for changing the frequency of the carrier of the FM transmitting circuit 20 to the IF circuit 60 in synchronization with a predetermined clock signal according to the instruction from the controller 32. The IF circuit 60 according to a first embodiment of the present invention outputs the above frequency data and predetermined clock signal as the serial data SDA and clock signal SCL, respectively.

In accordance with the instruction from the controller 32, the output unit 71 makes preparations for a storage address of the audio data stored in the ROM 61, and outputs the storage address to the ROM 61 while the setting unit 70 transmits the frequency data. To be more specific, the output unit 71 outputs the storage address of the audio data to the ROM 61 in such timing that the setting unit 70 starts to transmit the frequency data. The output unit 71 stops outputting the storage address of the audio data to the ROM 61 in such timing that the setting unit 70 completes transmission of the frequency data.

The power amplifier 22 amplifies the audio signal output from the DAC 62 to drive the speaker 23 so that the audio signal of the DAC 62 is reproduced by the speaker 23 included in the transmitting device 10. Therefore, in a first embodiment, when the audio signal converted from the audio data is input to the power amplifier 22, the beep sound is reproduced from the speaker 23.

Figure 3:
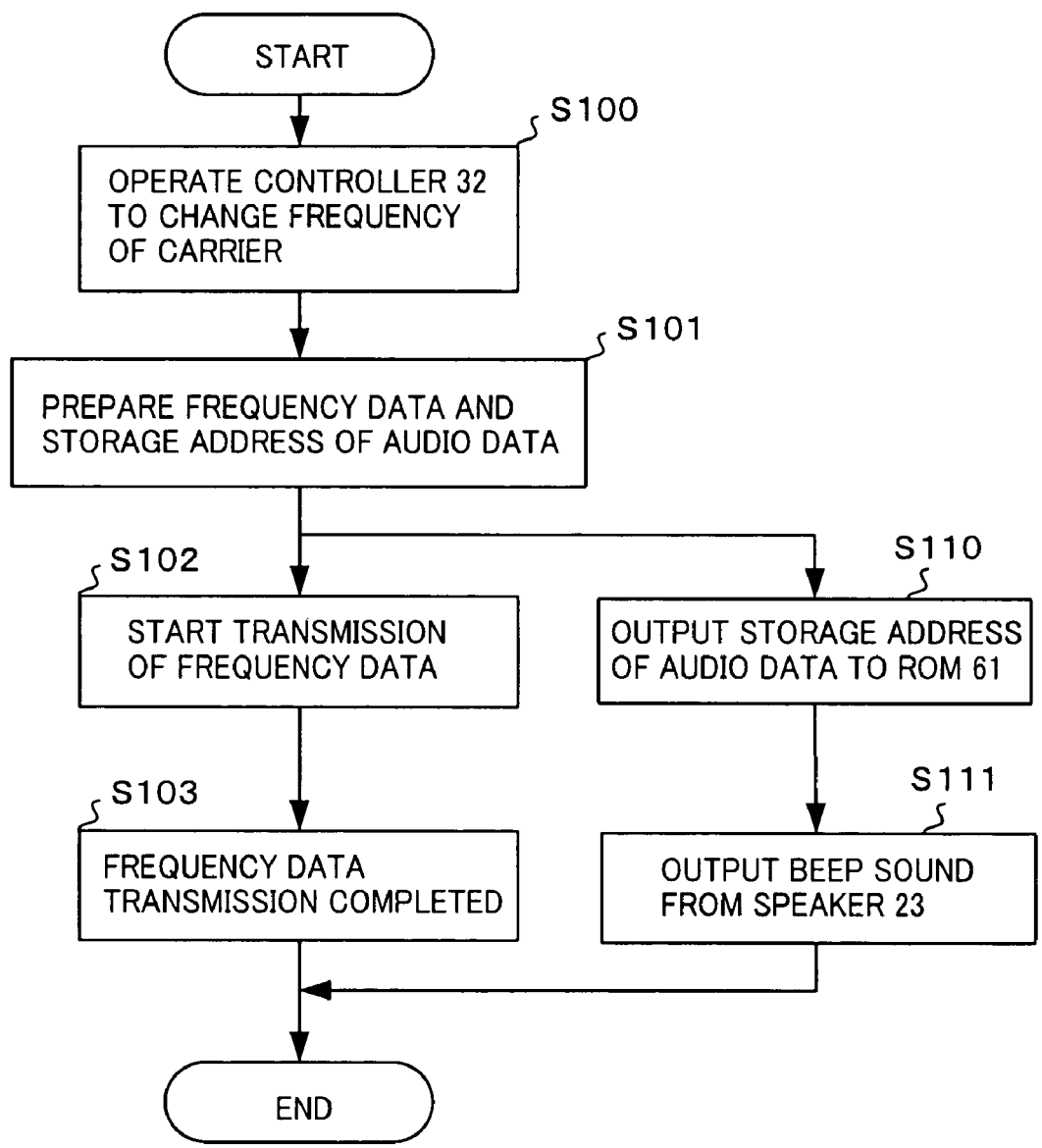
FIG. 3 is a flowchart for describing an operation of a transmitting device 10.
Figure 4:
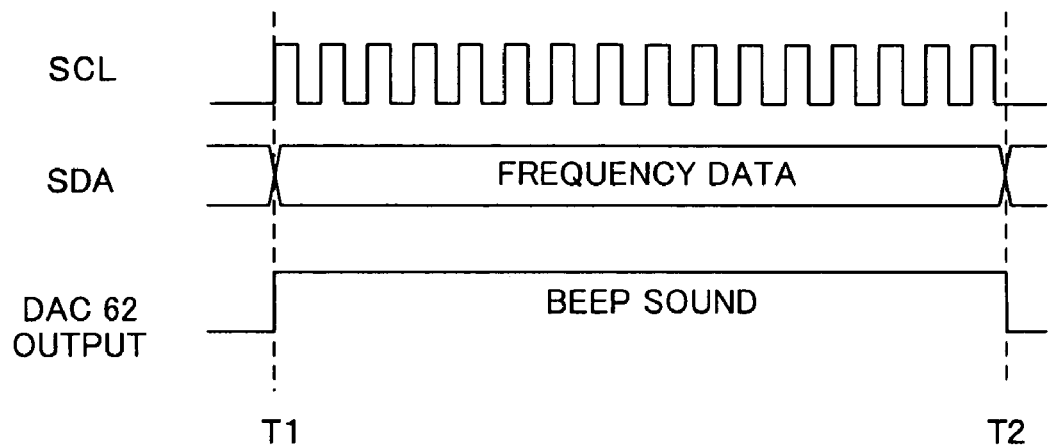
FIG. 4 is a timing chart for describing an operation of a transmitting device 10.

An operation will now be described of the transmitting device 10 with reference to a flowchart shown in FIG. 3 and a timing chart shown in FIG. 4. Here, the frequency of the carrier of the FM transmitting circuit 20 is already set and an operation when changing the frequency will be described. When changing the frequency of the carrier, the audio signals RIN and LIN from the music reproducing device 30 are temporarily stopped and the car stereo (not shown) is in a soundless state. Firstly, the user operates the controller 32 so that the frequency of the carrier of the FM transmitting circuit 20 is changed to a desired frequency (S100). As a result, the instruction corresponding to a result of the operation of the controller 32 is transmitted to the CPU 63 through the IF circuit 60. Then, the setting unit 70 and the output unit 71 makes preparations for the frequency data and the storage address of the audio data, respectively, according to the instruction from the controller 32 (S101). When the frequency data and the storage address are prepared, the setting unit 70 starts to transmit the frequency data to the IF circuit 60 at time T1 (S102). As a result, at the time T1, the serial data SDA is output from the IF circuit 60 in synchronization with the clock signal SCL. The output unit 71 outputs the storage address of the audio data to the ROM 61 at the time T1, in the same timing as that of the start of transmission of the frequency data (S110). When the storage address is specified in the ROM 61, the audio data is input to the DAC 62, and as a result, from the time T1, the beep sound is reproduced from the speaker 23 (S111). When the setting unit 70 has completed transmission of the frequency data at time T2 (S103), the output unit 71 stops outputting the storage address. Therefore, in a first embodiment of the present invention, while the IF circuit 60 outputs the serial data for setting the frequency of the carrier of the FM transmitting circuit 20, the beep sound is reproduced from the speaker 23.

Figure 5:
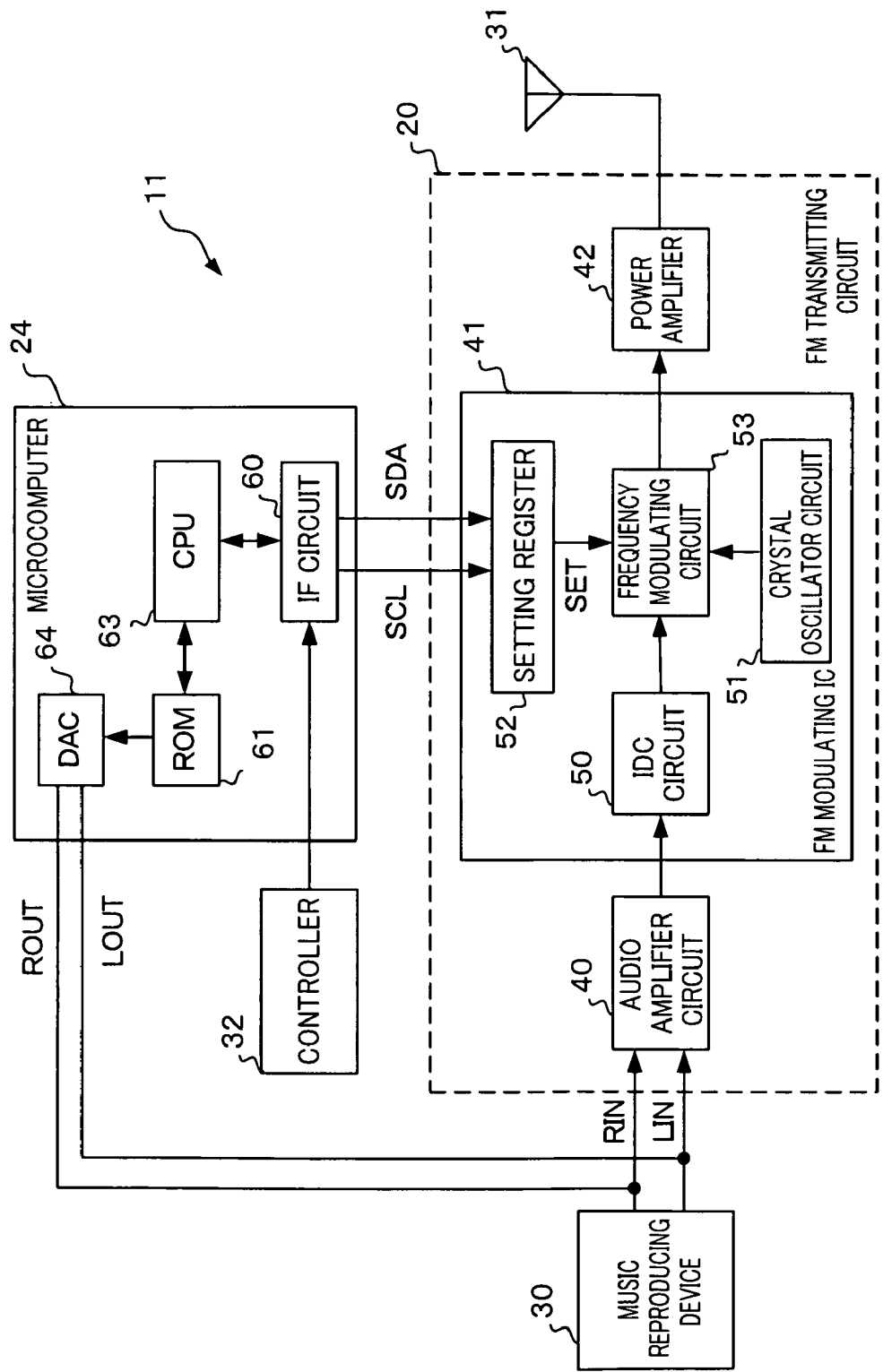
FIG. 5 is a diagram illustrating a configuration of a transmitting device 11 according to a second embodiment of the present invention.
Figure 6:
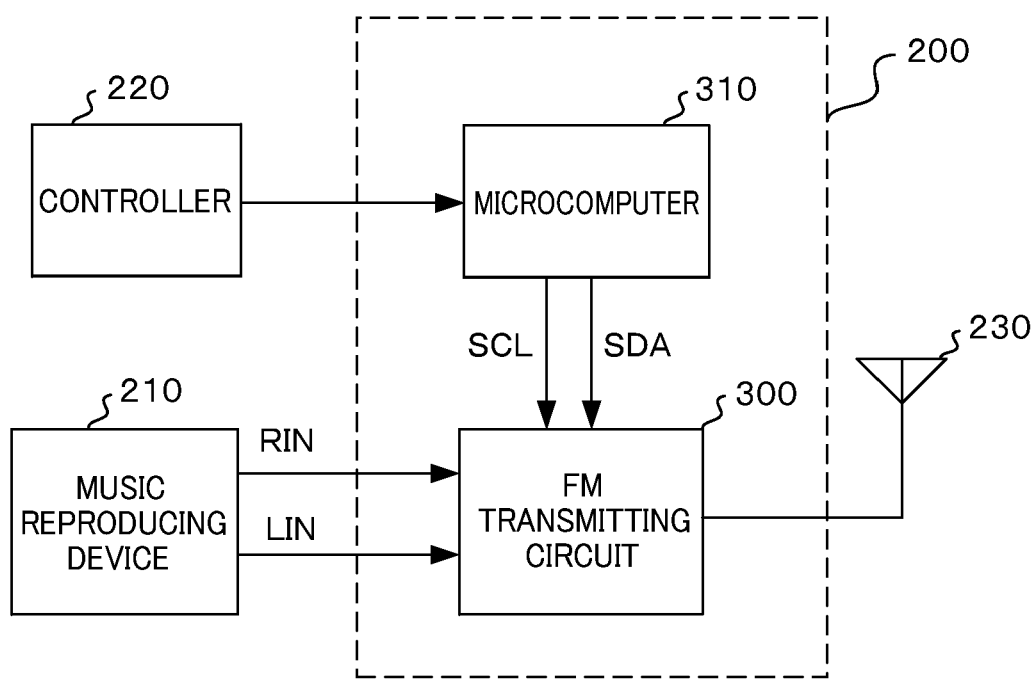
FIG. 6 is a diagram illustrating one example of a common transmitting device.

FIG. 5 depicts a configuration of a transmitting device 11 according to a second embodiment of the present invention. As is the case with the transmitting device 10 according to a first embodiment of the present invention, the transmitting device 11 is a device for transmitting the audio signal output from, for example, the music reproducing device 30 as the FM signal from the antenna 31 to be reproduced by the car stereo (not shown). The transmitting device 11 is a device that is capable of setting the frequency of the FM signal by the operation of the controller 32 by the user. The transmitting device 11 according to a second embodiment of the present invention includes the FM transmitting circuit 20 and a microcomputer 24. The FM transmitting circuit 20 in the transmitting device 11 is the same as the FM transmitting circuit 20 of the transmitting device 10. The music reproducing device 30, the antenna 31, and the controller 32 according to a second embodiment are the same as the music reproducing device 30, the antenna 31, and the controller 32 according to a first embodiment of the present invention, respectively.

The microcomputer 24 (digital data processing circuit) is a circuit that controls the FM transmitting circuit 20 according to the instruction from the controller 32, which is operated by the user in order to set the frequency of the FM signal. The microcomputer 24 includes the IF circuit 60, the ROM 61, the CPU 63, and a DAC 64. The IF circuit 60, the ROM 61, and the CPU 63 are the same as the IF circuit 60, the ROM 61, and the CPU 63 in the transmitting device 10, respectively.

The DAC 64 (converting unit) is a circuit that converts digital audio data output from the ROM 61 into stereo analog audio signals ROUT and LOUT, and outputs these converted signals to nodes to which the audio signals RIN and LIN in the audio amplifier circuit 40 is input. Therefore, when comparing between the transmitting device 10 of a first embodiment of the present invention and the transmitting device 11 of a second embodiment of the present invention, there is a difference in an output destination of the audio data stored in the ROM 61.

An operation of the transmitting device 11 will now be described referring again to the flowchart of FIG. 3 used when describing the operation of the transmitting device 10. Here, the frequency of the carrier of the FM transmitting circuit 20 is already set and the operation when changing the frequency will be described. When changing the frequency of the carrier in a second embodiment of the present invention, the audio signals RIN and LIN from the music reproducing device 30 are temporarily stopped and the car stereo (not shown) is in the soundless state. As described above, when comparing between the microcomputer 24 according to a second embodiment of the present invention and the microcomputer 21 according to a first embodiment of the present invention, since the IF circuit 60, the ROM 61, and the CPU 63 are common, the microcomputers 24 and 21 differs in only step S111 in a sequence of processing for changing the frequency of the carrier of the FM transmitting circuit 20. To be more specific, in a second embodiment of the present invention, when the output unit 71 outputs the storage address of the audio data to the ROM 61, the audio data of the ROM 61 is output to the DAC 64. The DAC 64 outputs the stereo audio signals ROUT and LOUT based on the audio data. Since the audio signals ROUT and LOUT from the DAC 64 are input to the audio amplifier circuit 40, an output of the audio amplifier circuit 40 is transmitted from the antenna 31, through the FM modulating IC 41 and power amplifier 42, over the carrier of the frequency based on the setting data, which is setting data before being changed, set in the setting register 52. Therefore, in a second embodiment of the present invention, while the serial data SDA for changing the frequency of the carrier is output from the IF circuit 60, the beep sound is reproduced from the car stereo (not shown).

In the transmitting device 10 according to a first embodiment of the present invention and the transmitting device 11 according to a second embodiment of the present invention, each of which has a configuration described above, while the serial data SDA is transmitted to the FM modulating IC 41, the output unit 71 outputs the storage address of the audio data stored in the ROM 61. As a result, even in a case where the influence of the harmonic, etc., of the serial data SDA appears in an audible range so that a sound of transmitting the serial data SDA is output from the car stereo, the beep sound, which is a predetermined audio signal, is reproduced, and therefore, it becomes possible to mask the sound of transmitting the serial data SDA. Thus, it is possible to prevent the user from suspecting a trouble of the transmitting device 10 or 11 due to the sound of transmitting the serial data SDA.

In the transmitting device 10 according to a first embodiment of the present invention, the DAC 62 converts the audio data stored in the ROM 61, to drive the speaker 23 included in the transmitting device 10 through the power amplifier 22. Therefore, in the transmitting device 10, since the beep sound may be reproduced from the speaker 23 included in the transmitting device 10, the sound of transmitting the serial data SDA may be masked.

In the transmitting device 11 of a second embodiment of the present invention, the DAC 64 converts the audio data stored in the ROM 61, to be output to the audio amplifier circuit 40 of the FM transmitting circuit 20. Therefore, even in a case where the speaker is not provided in the transmitting device itself unlike the transmitting device 10, since the beep sound may be reproduced in the car stereo (not shown), the sound of transmitting the serial data SDA may be masked.

The above embodiments of the present invention are simply for facilitating the understanding of the present invention and are not in any way to be construed as limiting the present invention. The present invention may variously be changed or altered without departing from its spirit and encompass equivalents thereof.

Although, in a first and second embodiments according to the present invention, the frequency of the carrier of the FM transmitting circuit 20 may be set based on the setting data, a power amplifier capable of changing a transmission power may be used, to change the transmission power of the power amplifier based on the setting data, for example. An audio amplifier circuit capable of outputting either the stereo composite signal or the monaural signal may be used in place of the audio amplifier circuit 40, to output either the stereo composite signal or the monaural signal based on the setting data. In the above cases as well, it is possible to mask the sound of transmitting the serial data SDA by reproducing the beep sound while the serial data SDA is transmitted.

In a first and second embodiments according to the present invention, there is employed a two-wire system in which the serial data SDA is transmitted in synchronization with the clock signal SCL when changing the setting data of the setting register 52, however, the same effect may be obtained in the case of one-wire or three-wire data transmission as well.

What is claimed is:
1. A digital data processing circuit comprising:
    a setting unit configured to set setting data on an audio signal processing circuit configured to generate an FM modulated signal based on the setting data, the FM modulated signal to be transmitted wirelessly to an FM radio receiver; and
    an output unit configured to output audio data for reproducing a predetermined audio signal while the setting unit sets the setting data on the audio signal processing circuit.
2. The digital data processing circuit of claim 1, further comprising:
    a converting unit configured to convert the audio data into the predetermined audio signal to be output to a speaker.
3. The digital data processing circuit of claim 1, further comprising:
    a converting unit configured to convert the audio data into the predetermined audio signal, wherein
    the audio signal processing circuit performs processing based on the setting data for the audio signal output from the converting unit, to generate the FM modulated signal for reproducing the predetermined audio signal by the FM radio receiver.

* * * * *